Dec. 5, 1939.　　　J. BJORKSTEN ET AL　　　2,181,864
HECTOGRAPH BLANKET HAVING A DUPLICATING SURFACE
COVERED WITH A NONADHESIVE FILM
Filed Feb. 28, 1938

Inventors:
Johan Bjorksten,
William Hoskins Jr.
By Zabel, Carlson, Gritzbaugh & Wells
Attorneys Patented Dec. 5, 1939

2,181,864

UNITED STATES PATENT OFFICE 2,181,864

HECTOGRAPH BLANKET HAVING A DUPLICATING SURFACE COVERED WITH A NON-ADHESIVE FILM

Johan Bjorksten, Chicago, and William Hoskins, Jr., La Grange, Ill., assignors to Ditto, Incorporated, Chicago, Ill., a corporation of West Virginia Application February 28, 1938, Serial No. 193,089

7 Claims. (Cl. 41—31.6)

This invention relates to the prevention of adhesion of surfaces of articles adapted to be rolled or otherwise placed in contact with each other or like articles. More particularly the invention has reference to the prevention of adhesion of hectograph blankets.

One embodiment of the invention is a hectograph blanket having a duplicating surface covered with a non-adhesive readily removable film, whereby the hectograph blanket may be wound up into a roll or stacked, even when freshly prepared, and may be immediately marketed without danger of the blankets tightly adhering to each other.

Other objects and advantages of the invention will become apparent as the following detailed description progresses, reference being had to the accompanying drawing, wherein—

Figure 1:
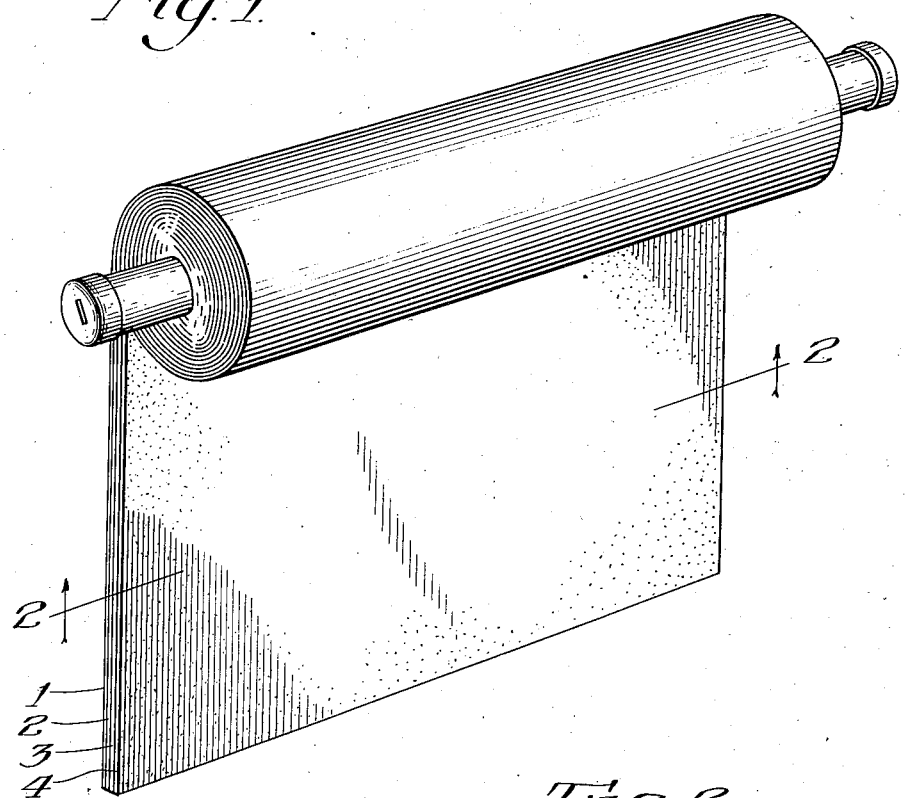
Fig. 1 is a perspective view of the hectograph roll embodying the invention.
Figure 2:
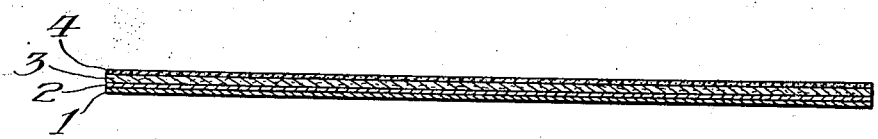
Fig. 2 is a sectional elevation taken along line 2—2 of Fig. 1.

Referring to the drawing in which a preferred embodiment of the invention is shown, reference character 1 designates a backing sheet, having secured to it by means of the adhesive film 2 a duplicating composition 3, covered with a non-adhesive film 4.

The backing sheet may suitably be any strong flexible sheet material, such as cotton cloth or heavy paper. The adhesive film 2 may suitably be linseed oil or any other material which will adhere well to the backing 1 and to the duplicating composition 3. The adhesive film 2, however, may be eliminated with less satisfactory results. The duplicating composition 3 may suitably be the usual gelatinous hectograph composition comprising gelatin or glue, glycerin and water.

In accordance with the invention the covering film 4 is a non-adhesive composition of such consistency that it is easy to remove, for example, by wiping with a cloth or sponge.

It has been found that a coating of pectin or agar provides good protection from sticking and may be readily removed.

It is preferred, however, to modify the consistency of the non-adhesive film, such as pectin or agar, and make it more readily removable by incorporating uniformly a powdered material such as starch or talc with the non-adhesive film-forming composition.

The preferred non-adhesive composition is a mixture of starch and pectin.

Various kinds of starch may be used, such as, for example, raw starch, cooked starch, chlorinated starch and other so-called soluble starches, but it is preferred to use a chlorinated starch. A type of chlorinated starch which is suitable is known commercially as "Hurona" starch.

The proportions of finely powdered material and film forming material may be varied quite widely. In the case of starch and pectin, however, it is preferred to use about one half to two and a half per cent of pectin in water solution and five to twenty-five per cent of starch in suspension. Where pectin is used alone it may suitably be applied in one quarter to three per cent solution.

To illustrate a practical application of the invention, the following example is given:

The gelatin layer of a hectograph roll is contacted with a roller which is partly immersed in a suspension of 17% chlorinated starch in a 1 per cent pectin solution. A thin coating of the adhesion preventing coating is thus applied to the hectograph mass. The mass can now be wound up into a roll and stored in this condition without any danger of sticking over an extended period of time.

Although, by way of illustration reference has been made specifically to hectograph rolls, it is fully realized that the procedures and compositions disclosed may be used for analogous purposes, for example, in the manufacture of adhesive tape or in continuous production of resin impregnated textiles, or boards and the like.

While there have been shown and described certain forms of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

We claim:

1. A hectograph blanket, the duplicating surface of which is covered with a removable non-adhesive film comprising a substance selected from the group consisting of algins and pectins.

2. A duplicating blanket, the surface of which is covered with a non-adhesive composition comprising a water-soluble substance selected from the group consisting of algins and pectins, and having distributed therein a finely powdered solid material.

3. A hectograph blanket, the duplicating surface of which is covered with a film comprising pectin.

4. A hectograph blanket, the duplicating surface of which is covered with a film comprising agar.

5. A hectograph blanket, the duplicating surface of which is covered with a film comprising pectin and starch.

6. A hectograph blanket, the duplicating surface of which is covered with a film comprising agar and starch.

7. A hectograph blanket, the duplicating surface of which is covered with a film comprising pectin and chlorinated starch.

JOHAN BJORKSTEN.
WILLIAM HOSKINS, Jr.